US011915896B2

(12) United States Patent
Kshirsagar et al.

(10) Patent No.: US 11,915,896 B2
(45) Date of Patent: Feb. 27, 2024

(54) PRESSURE SWITCH PISTON

(71) Applicant: EATON INTELLIGENT POWER LIMITED, Dublin (IE)

(72) Inventors: Pooja Kshirsagar, Pune (IN); Robert Schiesser, Brookfield, CT (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/871,570

(22) Filed: Jul. 22, 2022

(65) Prior Publication Data

US 2023/0026683 A1 Jan. 26, 2023

(30) Foreign Application Priority Data

Jul. 22, 2021 (IN) ............................ 202111032959

(51) Int. Cl.
*H01H 35/38* (2006.01)

(52) U.S. Cl.
CPC .................................. *H01H 35/38* (2013.01)

(58) Field of Classification Search
CPC .... H01H 35/38; H01H 2223/024; H01H 3/24; H01H 35/24; H01H 35/245; H01H 35/2614; H01H 35/2628; H01H 35/2635; H01H 35/30; H01H 35/32; H01H 35/34
See application file for complete search history.

(56) References Cited

U.S. PATENT DOCUMENTS 2,327,054 A 8/1943 Mays
2,759,061 A 8/1956 Edelman
2,800,548 A 7/1957 Stary
3,043,929 A 7/1962 Guthrie
4,229,629 A 10/1980 Pawlowski
4,644,116 A * 2/1987 Miyakawa ............. H01H 35/34 200/83 J
4,827,093 A 5/1989 Strzodka
4,980,675 A * 12/1990 Meisenheimer, Jr. .. G01L 19/04 340/626

(Continued)

FOREIGN PATENT DOCUMENTS

| | | |
|---|---|---|
| EP | 3 832 281 A1 | 6/2021 |
| FR | 2 618 595 A1 | 7/1987 |
| GB | 2 074 253 A | 10/1981 |

(Continued)

OTHER PUBLICATIONS

Extended European Search Report for Application No. 22186429.1 dated Dec. 19, 2022.

*Primary Examiner* — Ahmed M Saeed
(74) *Attorney, Agent, or Firm* — Merchant & Gould P.C.

(57) ABSTRACT

A pressure switch includes an actuation unit disposed within a body of the pressure switch and biased in a first direction by a spring arrangement and accessible at a fitting end of the pressure switch to be movable in a second direction against the bias of the spring by fluid at the fitting end. The actuation unit includes a limiter trapped in a pocket to limit the range of travel of the actuation unit, thereby safeguarding the electrical switch element from sustaining damage due to excessive travel. The pocket may be formed by the cooperation of two separate pieces. The spring arrangement may be biased by another piece disposed within a body of the pressure switch.

21 Claims, 4 Drawing Sheets

(56) References Cited

U.S. PATENT DOCUMENTS

| | | | | |
|---|---|---|---|---|
| 7,605,336 | B2 | 10/2009 | Kosht | |
| 10,361,047 | B1 * | 7/2019 | Tsay | H01H 35/24 |

FOREIGN PATENT DOCUMENTS

| | | | |
|---|---|---|---|
| JP | H07-220593 | A | 8/1995 |
| JP | H09-282990 | A | 10/1997 |
| TW | 1587345 | B | 6/2017 |

* cited by examiner

PRESSURE SWITCH PISTON

CROSS-REFERENCE TO RELATED APPLICATION

This application claims the benefit of Indian Provisional Patent Application No. 202111032959, filed on Jun. 22, 2021, the disclosure of which is incorporated herein by reference in its entirety.

BACKGROUND

FIG. 1 illustrates a piston-type pressure switch 100 including an actuator 104 disposed between a switching component 102 and a piston 106. The actuator 104 is movable (e.g., translatable) along an axis A relative to the switching component 102 between an unpressurized position and a pressurized position. The switching component 102 is calibrated to transition states and output a switching signal when the actuator 104 travels a predetermined distance along the axis A. For example, the switching component 102 may transition states when the actuator 104 travels sufficiently far to engage a trigger 108 (e.g., a microswitch actuation button) of the switching component 102.

The actuator 104 is biased in a first direction D1 along the axis A by a spring arrangement 110 of one or more spring members. The piston 106 presses against the actuator 104 to counter the spring bias and to move the actuator 104 in a second direction D2 along the axis A towards the switching component 102. The piston 106 moves along the axis A towards the actuator 104 when fluid enters a switch body 112 through a fitting end 114 from a conduit. The piston 106 includes a limiter member 116 that travels within a pocket or cavity 118 to limit the travel of the piston 106 within the switch body 112.

The spring arrangement 110 is configured to bias the actuator 104 in the first direction D1 throughout the travel of the actuator 104. Accordingly, the piston 106 typically entrains the actuator 104 as the piston 106 moves along the axis A throughout the entire range of travel of the actuator 104. In certain cases, however, the fluid entering the fitting end 114 can have a pressure rise rate that is sufficiently high to move the piston 106, and hence the actuator 104, with such velocity to launch the actuator 104 towards the switching component 102. In such cases, the limiter member 116 stops the piston 106 from advancing, but not the actuator 104, which separates from the piston 106 and continues to travel against the bias of the spring arrangement 110. Over travel of the actuator 104 can damage or break the switching component 102. Improvements are desired.

SUMMARY

Some aspects of the disclosure are directed to a pressure switch having a safeguard against over travel of the actuator.

In certain implementations, the actuator and the piston are formed as a single actuation unit (e.g., monolithically formed) so that the limiter member of the piston also limits travel of the actuator.

In certain implementations, the actuation unit has an intermediate region at which the limiter member extends outwardly. In certain examples, a transverse cross-dimension of the actuation unit is largest at the intermediate region.

In certain examples, the actuation unit defines a hollow cavity having an open end facing the fitting end of the pressure switch body.

In certain examples, the actuation unit carries a seal member that provides a fluid tight seal between the actuation unit and the pressure switch body.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
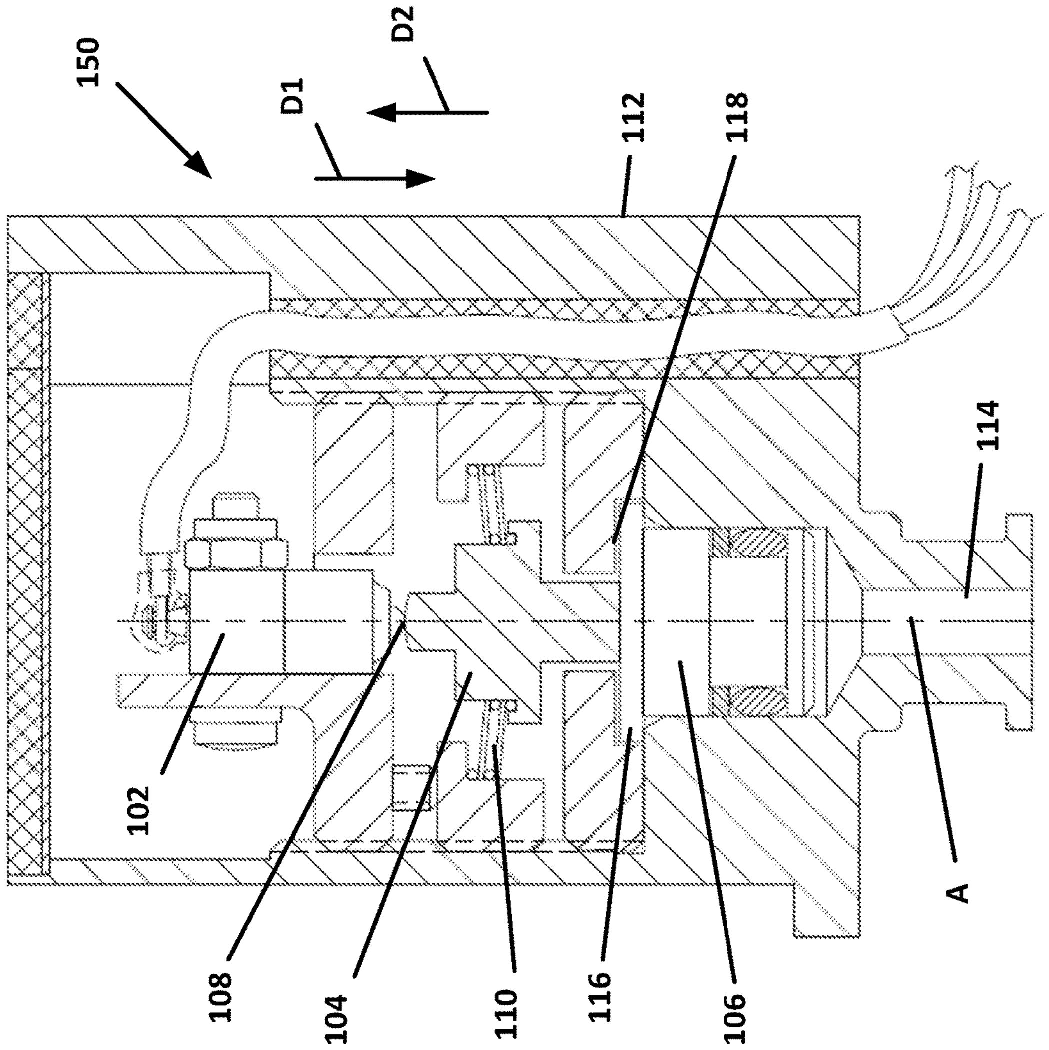
FIG. 1 is a cross-sectional view of an example pressure switch including an actuator and a separate piston.
Figure 2:
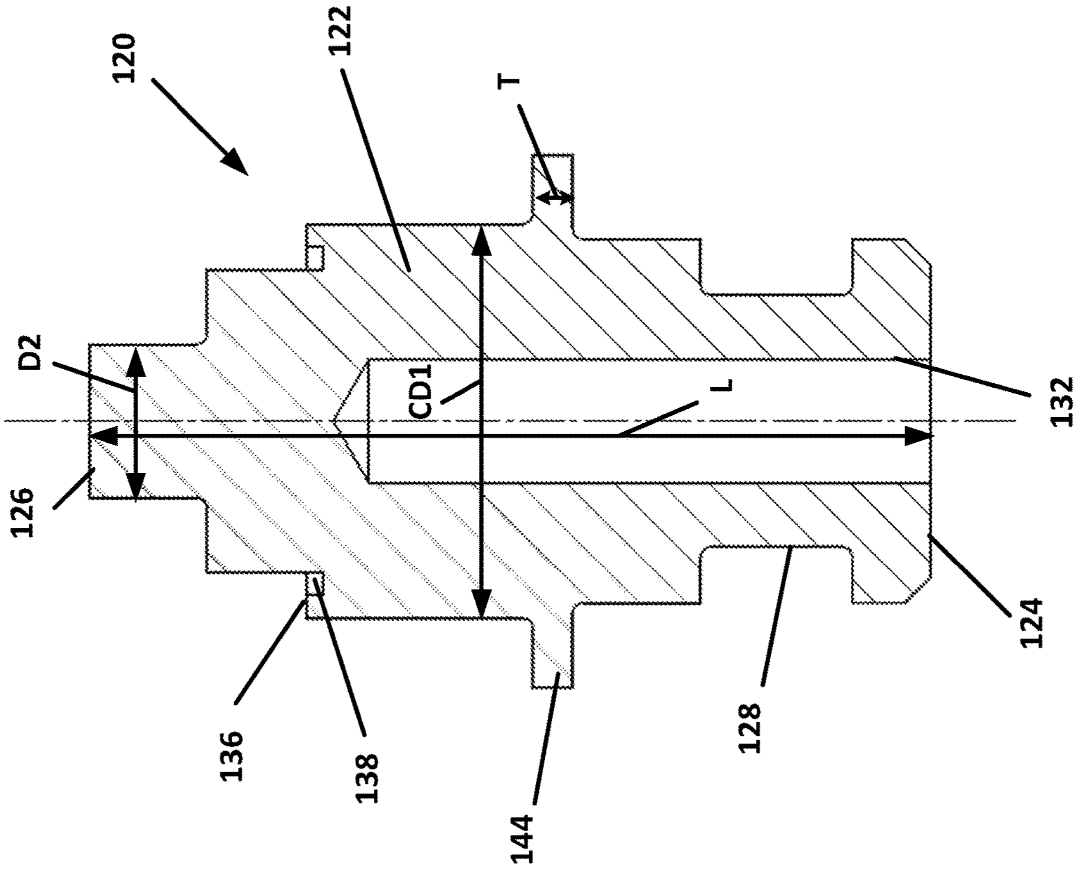
FIG. 2 is a cross-sectional view of an example actuation unit configured in accordance with the principles of the present disclosure.
Figure 3:
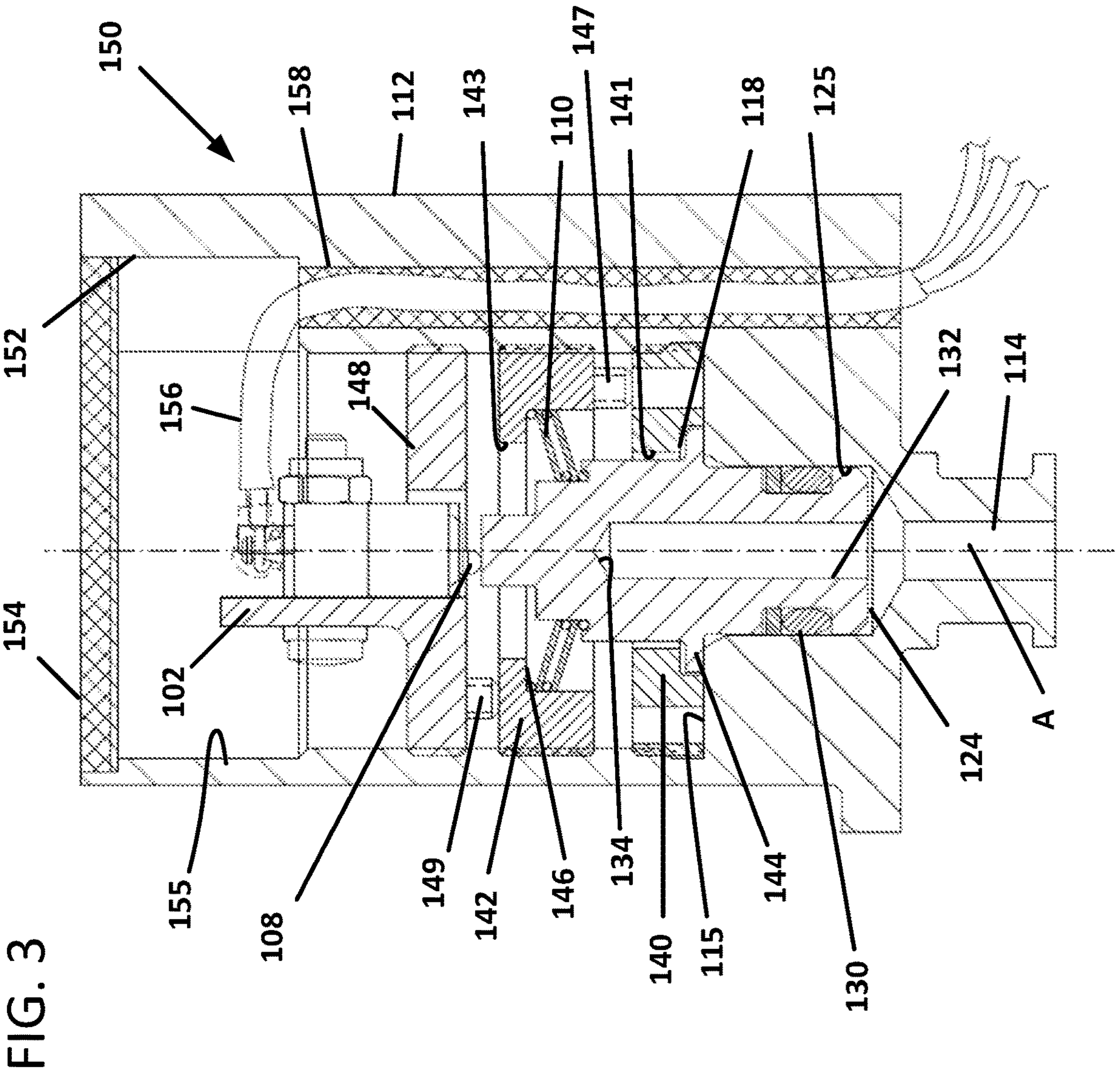
FIG. 3 is a cross-sectional view of the actuation unit of FIG. 2 disposed within an example implementation of a pressure switch body.

The present disclosure is directed to a pressure switch 150 having a safeguard against over engaging the switching component 102 with excessive displacement/force. The pressure switch 150 includes an actuation unit 120 that replaces the actuator 104 and piston 106 of the pressure switch 100 of FIG. 1. The actuation unit 120 includes a main body 122 extending along a length L from a first end 124 to a second end 126. The first end 124 faces the fitting end 114 of the pressure switch housing 112. The second end 126 faces the trigger 108 of the switching component 102.

The actuation unit 120 is movable within the pressure switch housing 112 between an unpressurized position and a pressurized position. In the unpressurized position, the second end 126 of the actuation unit 120 does not actuate the trigger 108 of the switching component 102 (e.g., is spaced from the trigger 108 or contacts the trigger 108 without depressing the trigger 108). In the pressurized position, the second end 126 of the actuation unit 120 actuates the trigger 108 (e.g., contacts and deflects the trigger 108).

In certain implementations, the main body 122 of the actuation unit 120 defines a hollow cavity 132 extending along the length L of the actuation unit 120 from the first end 124. In certain examples, the hollow cavity 132 extends along a majority of the length L. In certain examples, the first end 124 of the actuation unit 120 in conjunction with a surface 134 of the hollow cavity 132 is configured to receive the upward force applied by the fluid entering the switch body 112 through the fitting end 114. The hollow cavity 132 lightens the actuation unit body 122, thereby requiring less force to transition the actuation unit 120 between the unpressurized and pressurized positions.

The actuation unit 120 has a sealing region 128 at which a seal arrangement 130 is disposed. The actuation unit 120 is mounted within the switch body 112 so that the seal arrangement 130 engages a sealing surface surrounding the actuation unit 120 as the actuation unit 120 slides along the axis A. The seal arrangement 130 inhibits fluid from the fitting end 114 from reaching the switching component 102. In the example shown, the seal arrangement 130 includes an O-ring and a washer. In other examples, the seal arrangement 130 may have other configurations (e.g., multiple O-rings).

The actuation unit 120 includes a limiter 144 that extends radially outwardly from the actuation unit 120 at an intermediate location along the length L of the actuation unit 120. In certain examples, the limiter 144 includes a radial flange extending outwardly from the main body 122 of the actuation unit 120. In some examples, the limiter 144 is monolithically formed with the main body 122 of the actuation unit 120. In other examples, the limiter 144 may be formed of a different material (e.g., a stronger material) from the main body 122. In some examples, the limiter 144 and/or the main body 122 of the actuation unit 120 is formed from stainless steel (e.g., 300 series stainless steel, 15-5 PH stainless steel, 17-4 PH stainless steel, etc.). In other examples, the limiter 144 and/or the main body 122 may be formed from an Aluminum alloy.

In certain implementations, a first insert 140 is disposed within the switch body 112 and secured to be stationary relative to the switch body 112. The first insert 140 defines an aperture 141 through which the main body 122 of the actuation unit 120 extends. The first insert 140 cooperates with the switch body 112 to define the pocket or cavity 118 into which the limiter 144 extends. The pocket or cavity 118 is sized to enable travel of the limiter 144 within the pocket or cavity 118 over a distance along the axis A. The distance is sufficiently long to enable movement of the second end 126 of the actuation unit 120 from a position in which the switching component trigger 108 is not actuated to a position in which the switching component trigger 108 is actuated. In certain examples, the distance is sufficiently long to enable movement of the second end 126 from a position in which the second end 126 does not contact the trigger 108 to a position in which the second end 126 contacts and actuates the trigger 108. In other examples, the second end 126 always contacts the trigger 108. In such examples, the distance is sufficiently long to enable sufficient movement of the second end 126 to displace the trigger 108 from a non-actuation position to an actuation position.

In certain implementations, the limiter 144 engages the insert body 112 when the actuation unit 120 is disposed in the unpressurized position and the limiter 144 engages the first insert 140 when the actuation unit 120 is disposed in the pressurized position. Engagement between the limiter 144 and a shoulder of the first insert 140 inhibits further movement of the limiter 144, and hence the actuation unit 120, in the second direction D2. Accordingly, the actuation unit 120 cannot over travel and damage the switching component 102.

Figure 4:
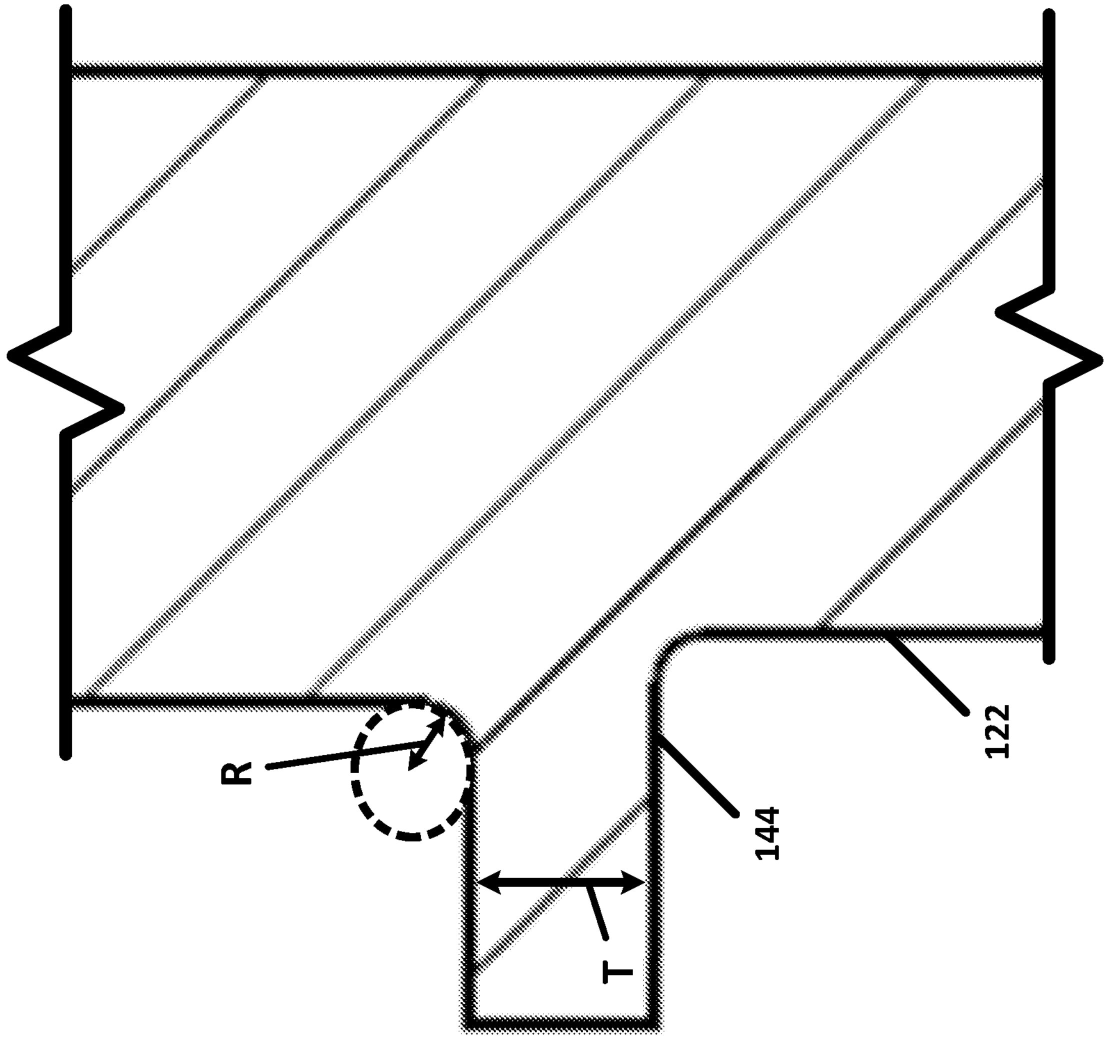
FIG. 4 is an enlarged view of a portion of FIG. 2.

In certain implementations, the limiter 144 is sized and shaped to fit within the pocket of cavity 118 while retaining sufficient strength to avoid breaking (e.g., shearing) of the limiter 144. In certain examples, the limiter 144 has a thickness T (see FIG. 4) of less than 0.1 inches. In certain examples, the limiter 144 has a thickness T of between 0.03 inches and 0.1 inches. In certain examples, the limiter 144 has a thickness T of between 0.038 inches and 0.09 inches. In certain examples, the thickness T is about 0.038 inches to about 0.5 inches. In certain examples, the thickness T is about 0.04 inches to about 0.07 inches. In certain examples, the thickness T is about 0.06 inches to about 0.09 inches. In certain examples, the thickness T is about 0.07 inches to about 0.1 inches.

In certain implementations, a top of the limiter 144 has a fillet radius R (e.g., see FIG. 4) of less than 0.04 inches. In certain examples, the fillet radius R is between about 0.01 inches to about 0.03 inches. In certain examples, the fillet radius is about 0.01 inches. In certain examples, the fillet radius is about 0.02 inches. In certain examples, the fillet radius is about 0.03 inches. In certain examples, the fillet radius is about 0.015 inches to 0.025 inches.

The actuation unit 120 has a spring stop region 136 at which a spring arrangement 110 is disposed. In certain examples, the spring stop region 136 defines a groove 138 in which a first end of a spring arrangement 110 may seat. In some implementations, the spring arrangement 110 includes a coil spring. In other implementations, the spring arrangement 110 includes a disc spring. In certain examples, the spring arrangement 110 includes multiple spring members (e.g., disc springs, coil springs, etc.) mounted at the spring stop region 136 to cooperatively produce spring force biasing the actuation unit 120 in the first direction D1.

In certain implementations, a second insert 142 is disposed within the switch body 112 and secured to be stationary relative to the switch body 112. The second insert 142 defines an aperture 143 through which the main body 122 of the actuation unit 120 extends so that the second end 126 can reach the switching component trigger 108. The second insert 142 defines a support surface 146 configured to receive the opposite end of the spring arrangement 110.

In certain implementations, the pressure switch 150 is assembled by inserting the actuation unit 120 into a chamber 155 of the switch body 112 through an open end 152. The actuation unit 120 is inserted so that the sealing region 128 extends into a conduit or cavity 125 leading from the chamber 155 to the fitting end 114. The actuation unit 120 carries the seal arrangement 130 to seal against the conduit or cavity 125 within the switch body 112. The seal arrangement 130 seals against fluid from the fitting end 114 reaching the chamber 155. The limiter 144 of the actuation unit 120 seats on a shoulder or support surface 115 of the switch body 112 surrounding the conduit or cavity 125.

The first insert 140 is inserted into the chamber 155 of the switch body 112 through the open end 152. The first insert 140 is moved towards the support surface 115 so that the second end 126 of the actuation unit body 122 passes through the aperture 141 defined through the first insert 140. The first insert 140 attaches to the switch body 112 to be stationary relative to the switch body 112 during operation of the pressure switch 150. In some examples, the first insert 140 is threadably attached to the switch body 112. In certain examples, fasteners may be added to secure the first insert 140 to the support surface 115. In other examples, a radial outer wall of the first insert 140 may be welded, affixed, or otherwise attached to the interior of the switch body 112. The first insert 140 cooperates with the support surface 115 to trap the limiter 144 within the pocket 118, thereby restricting movement of the actuation unit 120 relative to the switch body 112.

In certain implementations, the body 122 of the actuation unit 120 has a largest cross-dimension CD1 adjacent the limiter 144 between the limiter 144 and the second end 126. The aperture 141 of the first insert 140 is sized accordingly. In certain examples, a cross-dimension of the body 122 progressively reduces as the body 122 extends from the limiter 144 to the second end 126. In certain examples, the body 122 does not define any undercuts between the limiter 144 and the second end 126.

The spring arrangement 110 is inserted into the chamber 155 of the switch body 112 through the open end 152 and seated at the spring stop region 136 (e.g., in the groove 138). The second insert 142 is inserted into the chamber 155 of the switch body 112 through the open end 152 moved towards the first insert 140 until the second end 126 of the actuation unit 120 extends through the aperture 143. In some implementations, the second insert 142 is inserted into the switch body 112 after the spring arrangement 110. In other implementations, the second insert 142 is inserted into the switch body 112 with the spring arrangement 110 (e.g., the spring arrangement 110 is attached to the second insert 142). The second insert 142 is secured (e.g., threadably mounted) to the interior of the switch body 112. In the example shown, the second insert 142 includes a set screw 147 that seats on the first insert 140 to space the second insert 142 from the first insert 140.

The switching component 102 is inserted into the chamber 155 of the switch body 112 through the open end 152. In certain implementations, the switching component 102 is mounted to a support frame 148 that is secured (e.g., threadably mounted) to the interior of the switch body 102. In the example shown, the support frame 148 includes one or more set screws 149 that seat on the second insert 142 to space the support frame 148 from the second insert 142. In some examples, a fastener may attach the support frame 148 to the second insert 142. In other examples, the support frame 148 and the second insert 142 may be combined as single component. A wire 156 extends from the switching component 102 and through a sealed channel 158 through the switch body 112.

A lid 154 is attached (e.g., bonded, affixed, welded, friction fit, etc.) to the switch body 112 to close the open end 152. In certain examples, the lid 154 environmentally seals the chamber 155.

ASPECTS OF THE DISCLOSURE

1. A pressure switch arrangement comprising:
   - a pressure switch body defining a chamber, the pressure switch body also having a fitting end defining a conduit leading to the chamber;
   - a switching component disposed within the chamber of the pressure switch body, the switching component including a trigger;
   - an actuation unit disposed within the chamber and being movable relative to the switching component, the actuation unit extending along a length between a first end and a second end, the first end facing the fitting end and the second end facing the trigger, the actuation unit including a limiter disposed at an intermediate position between the first end and the second end, the actuation unit also defining a spring stop region disposed between the limiter and the second end;
   - an insert disposed within the chamber of the pressure switch body, the insert defining an aperture through which the actuation unit extends so that at least a portion of the insert is disposed between the limiter and the spring stop region of the actuation unit, the insert cooperating with the pressure switch body to define a pocket into which the limiter radially extends, the limiter being movable within the pocket as the actuation unit moves within the chamber; and
   - a spring arrangement engaging the spring stop region of the actuation unit, the spring arrangement biasing the actuation unit away from the trigger of the switching component.

2. The pressure switch arrangement of aspect 1, wherein the actuation unit defines a seal region aligned with the conduit.

3. The pressure switch arrangement of aspect 1 or aspect 2, wherein the actuation unit does not define any undercuts between the limiter and the second end of the actuation unit.

4. The pressure switch arrangement of any of aspects 1-3, wherein the actuation unit is configured to translate within the chamber along a path of travel, and wherein the pocket defines outer boundaries of the path of travel.

5. The pressure switch arrangement of any of aspects 1-4, wherein the spring arrangement includes a disc spring.

6. The pressure switch arrangement of claim 5, wherein the spring arrangement includes a plurality of disc springs.

7. The pressure switch arrangement of any of aspects 1-4, wherein the spring arrangement includes a coil spring.

8. The pressure switch arrangement of any of aspects 2-7, further comprising a seal arrangement disposed at the seal region, the seal arrangement including an O-ring.

9. The pressure switch arrangement of any of aspects 1-8, wherein the insert is a first insert; and wherein the first insert is threadably mounted to the switch body within the chamber.

10. The pressure switch arrangement of aspect 9, further comprising a second insert disposed within the chamber of the switch body, the second insert being configured to support the spring arrangement, the second insert defining an aperture through which the actuation unit extends.

11. The pressure switch arrangement of aspect 10, wherein the second insert includes a spacer that spaces the second insert from the first insert.

12. The pressure switch arrangement of any of aspects 1-11, wherein the spring stop region of the actuation unit defines a groove configured to receive a first end of the spring arrangement.

13. The pressure switch arrangement of any of aspects 1-12, wherein the limiter has a thickness of between 0.038 inches and 0.09 inches.

14. The pressure switch arrangement of any of aspects 1-13, wherein the limiter has a fillet radius of between 0.01 inches and 0.03 inches.

15. The pressure switch arrangement of any of aspects 1-14, wherein the limiter is formed of stainless steel.

16. The pressure switch arrangement of aspect 15, wherein the limiter has a thickness of less than 0.07 inches.

17. The pressure switch arrangement of any of aspects 1-14, wherein the limiter is formed of Aluminum alloy.

18. The pressure switch arrangement of aspect 17, wherein the limiter has a thickness of greater than 0.05 inches.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A pressure switch arrangement comprising:
- a pressure switch body defining a chamber, the pressure switch body also having a fitting end defining a conduit leading to the chamber;
- a switching component disposed within the chamber of the pressure switch body, the switching component including a trigger;

an actuation unit disposed within the chamber and being movable relative to the switching component, the actuation unit extending along a length between a first end and a second end, the first end facing the fitting end and the second end facing the trigger, the actuation unit including a limiter disposed at an intermediate position between the first end and the second end, the actuation unit also defining a spring stop region disposed between the limiter and the second end;

a first insert disposed within the chamber of the pressure switch body, the first insert defining a first aperture through which the actuation unit extends so that at least a portion of the first insert is disposed between the limiter and the spring stop region of the actuation unit, the first insert cooperating with the pressure switch body to define a pocket into which the limiter radially extends, the limiter being movable within the pocket as the actuation unit moves within the chamber, the first insert being threadably mounted to the pressure switch body within the chamber;

a spring arrangement engaging the spring stop region of the actuation unit, the spring arrangement biasing the actuation unit away from the trigger of the switching component; and a second insert disposed within the chamber of the pressure switch body, the second insert being configured to support the spring arrangement, the second insert defining a second aperture through which the actuation unit extends.

2. The pressure switch arrangement of claim 1, wherein the actuation unit defines a seal region aligned with the conduit.

3. The pressure switch arrangement of claim 1, wherein the actuation unit does not define any undercuts between the limiter and the second end of the actuation unit.

4. The pressure switch arrangement of claim 1, wherein the actuation unit is configured to translate within the chamber along a path of travel, and wherein the pocket defines outer boundaries of the path of travel.

5. The pressure switch arrangement of claim 1, wherein the spring arrangement includes a disc spring.

6. The pressure switch arrangement of claim 5, wherein the spring arrangement includes a plurality of disc springs.

7. The pressure switch arrangement of claim 1, wherein the spring arrangement includes a coil spring.

8. The pressure switch arrangement of claim 2, further comprising a seal arrangement disposed at the seal region, the seal arrangement including an O-ring.

9. The pressure switch arrangement of claim 1, wherein the second insert includes a spacer that spaces the second insert from the first insert.

10. The pressure switch arrangement of claim 1, wherein the spring stop region of the actuation unit defines a groove configured to receive a first end of the spring arrangement.

11. The pressure switch arrangement of claim 1, wherein the limiter has a thickness of between 0.038 inches and 0.09 inches.

12. The pressure switch arrangement of claim 1, wherein the limiter has a fillet radius of between 0.01 inches and 0.03 inches.

13. The pressure switch arrangement of claim 1, wherein the limiter is formed of stainless steel.

14. The pressure switch arrangement of claim 13, wherein the limiter has a thickness of less than 0.07 inches.

15. The pressure switch arrangement of claim 1, wherein the limiter is formed of Aluminum alloy.

16. The pressure switch arrangement of claim 15, wherein the limiter has a thickness of greater than 0.05 inches.

17. A pressure switch arrangement comprising:

a pressure switch body defining a chamber, the pressure switch body also having a fitting end defining a conduit leading to the chamber;

a switching component disposed within the chamber of the pressure switch body, the switching component including a trigger;

an actuation unit disposed within the chamber and being movable relative to the switching component, the actuation unit extending along a length between a first end and a second end, the first end facing the fitting end and the second end facing the trigger, the actuation unit including a limiter disposed at an intermediate position between the first end and the second end, the actuation unit also defining a spring stop region disposed between the limiter and the second end;

an insert disposed within the chamber of the pressure switch body, the insert defining an aperture through which the actuation unit extends so that at least a portion of the insert is disposed between the limiter and the spring stop region of the actuation unit, the insert cooperating with the pressure switch body to define a pocket into which the limiter radially extends, the limiter being movable within the pocket as the actuation unit moves within the chamber; and a spring arrangement engaging the spring stop region of the actuation unit, the spring arrangement biasing the actuation unit away from the trigger of the switching component, wherein the actuation unit defines a seal region for providing sealing between the actuation unit and the pressure switch body around a piston portion of the actuation unit, wherein the limiter includes a radial flange that extends outwardly from a main body of the actuation unit at the intermediate position along the length of the actuation unit, wherein the seal region is positioned between the limiter and the first end of the actuation unit, and wherein the radial flange has an outermost cross-dimension that is larger than an outermost cross-dimension of the seal region and is also larger than an outermost cross-dimension of a portion of the actuation unit extending from the radial flange to the second end of the actuation unit.

18. The pressure switch arrangement of claim 17, wherein the main body of the actuation unit defines a hollow cavity that extends from the first end of the actuation unit along a majority of the length of the actuation unit.

19. A pressure switch arrangement comprising:

a pressure switch body defining a chamber, the pressure switch body also having a fitting end defining a conduit leading to the chamber;

a switching component disposed within the chamber of the pressure switch body, the switching component including a trigger;

an actuation unit disposed within the chamber and being movable relative to the switching component, the actuation unit extending along a length between a first end and a second end, the first end facing the fitting end and the second end facing the trigger, the actuation unit including a limiter disposed at an intermediate position between the first end and the second end, the actuation unit also defining a spring stop region disposed between the limiter and the second end;

an insert disposed within the chamber of the pressure switch body, the insert defining an aperture through which the actuation unit extends so that at least a portion of the insert is disposed between the limiter and the spring stop region of the actuation unit, the insert cooperating with the pressure switch body to define a pocket into which the limiter radially extends, the limiter being movable within the pocket as the actuation unit moves within the chamber; and a spring arrangement engaging the spring stop region of the actuation unit, the spring arrangement biasing the actuation unit away from the trigger of the switching component;

wherein the limiter has a thickness of between 0.038 inches and 0.09 inches.

20. A pressure switch arrangement comprising:

a pressure switch body defining a chamber, the pressure switch body also having a fitting end defining a conduit leading to the chamber;

a switching component disposed within the chamber of the pressure switch body, the switching component including a trigger;

an actuation unit disposed within the chamber and being movable relative to the switching component, the actuation unit extending along a length between a first end and a second end, the first end facing the fitting end and the second end facing the trigger, the actuation unit including a limiter disposed at an intermediate position between the first end and the second end, the actuation unit also defining a spring stop region disposed between the limiter and the second end;

an insert disposed within the chamber of the pressure switch body, the insert defining an aperture through which the actuation unit extends so that at least a portion of the insert is disposed between the limiter and the spring stop region of the actuation unit, the insert cooperating with the pressure switch body to define a pocket into which the limiter radially extends, the limiter being movable within the pocket as the actuation unit moves within the chamber; and a spring arrangement engaging the spring stop region of the actuation unit, the spring arrangement biasing the actuation unit away from the trigger of the switching component;

wherein the limiter has a fillet radius of between 0.01 inches and 0.03 inches.

21. A pressure switch arrangement comprising:

a pressure switch body defining a chamber, the pressure switch body also having a fitting end defining a conduit leading to the chamber;

a switching component disposed within the chamber of the pressure switch body, the switching component including a trigger;

an actuation unit disposed within the chamber and being movable relative to the switching component, the actuation unit extending along a length between a first end and a second end, the first end facing the fitting end and the second end facing the trigger, the actuation unit including a limiter disposed at an intermediate position between the first end and the second end, the actuation unit also defining a spring stop region disposed between the limiter and the second end;

an insert disposed within the chamber of the pressure switch body, the insert defining an aperture through which the actuation unit extends so that at least a portion of the insert is disposed between the limiter and the spring stop region of the actuation unit, the insert cooperating with the pressure switch body to define a pocket into which the limiter radially extends, the limiter being movable within the pocket as the actuation unit moves within the chamber; and a spring arrangement engaging the spring stop region of the actuation unit, the spring arrangement biasing the actuation unit away from the trigger of the switching component;

wherein the limiter is formed of stainless steel; and wherein the limiter has a thickness of less than 0.07 inches.

* * * * *